Figure 1:
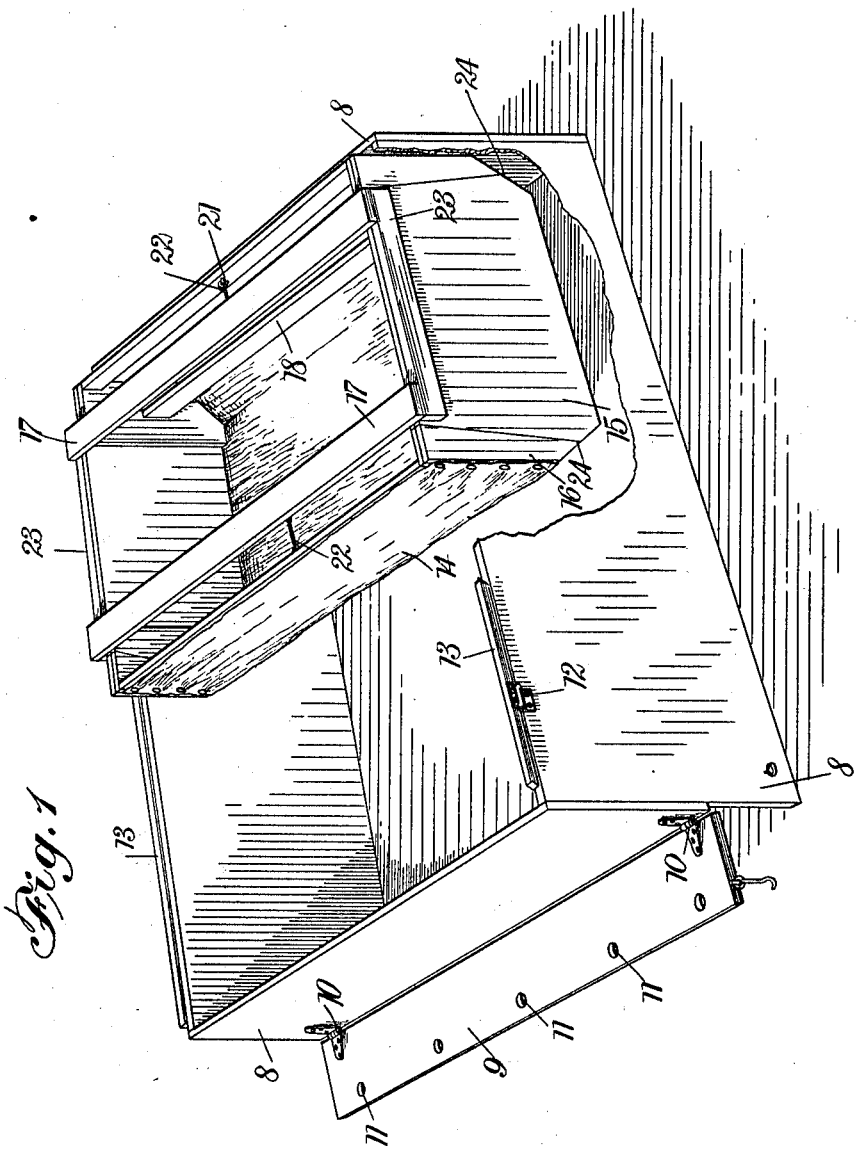

G. H. LEE.
BROODER.
APPLICATION FILED JULY 14, 1911.

1,031,455.

Patented July 2, 1912.

2 SHEETS—SHEET 1.

WITNESSES
Frank H. Vick Jr.

INVENTOR
George H. Lee
BY
ATTORNEYS

G. H. LEE.
BROODER.
APPLICATION FILED JULY 14, 1911.
1,031,455.
Patented July 2, 1912.
2 SHEETS—SHEET 2.
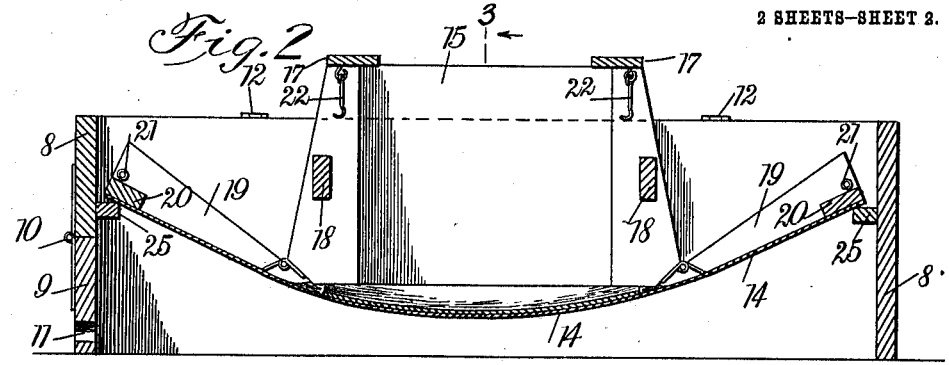
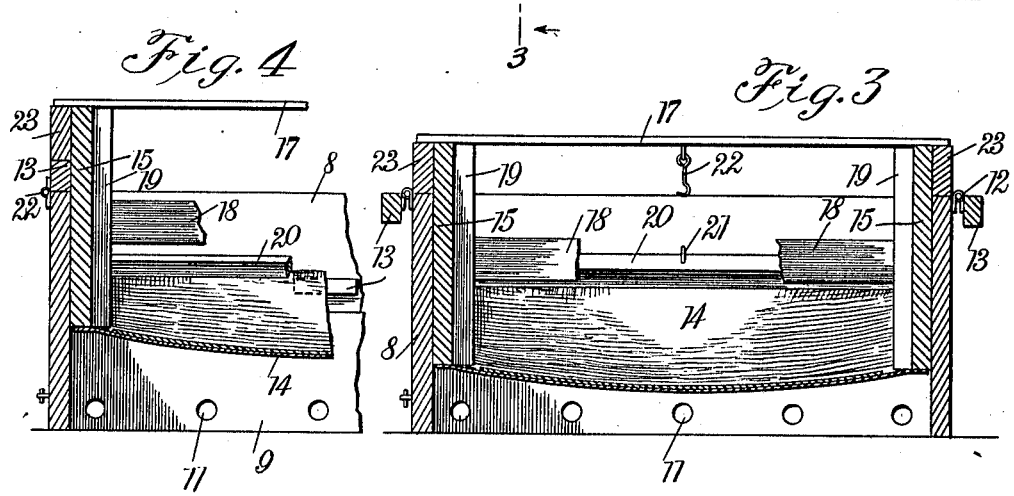
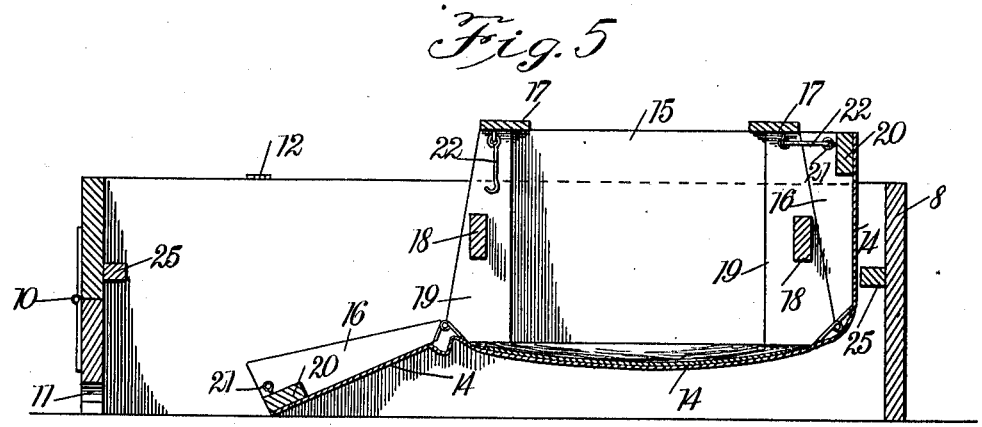
WITNESSES
F. E. Alexander
INVENTOR
George H. Lee
BY
ATTORNEYS

UNITED STATES PATENT OFFICE.

GEORGE HOWARD LEE, OF OMAHA, NEBRASKA.

BROODER.

1,031,455.  Specification of Letters Patent.  Patented July 2, 1912.

Application filed July 14, 1911. Serial No. 638,483.

*To all whom it may concern:*

Be it known that I, GEORGE H. LEE, a citizen of the United States, and a resident of Omaha, in the county of Douglas and State of Nebraska, have invented a new and Improved Brooder, of which the following is a full, clear, and exact description.

Among the principal objects which the present invention has in view are: to provide a brooder with a movable or portable hover; to construct and arrange a hover in such manner as to alternately confine the chicks under the hover or to free them therefrom; to furnish a hover the covering expanse whereof may be varied; to provide a hover open at the top to receive heat producing and heat retaining accessories if the use of such be required; to furnish means for varying the height of the hover; and to furnish a hover adapted for adjustment to limit the extent of the brooder.

With these objects in view the invention consists in constructing and arranging an open-topped brooder the walls whereof are sufficiently raised to prevent the escape of the chicks from the confines thereof.

It further consists in constructing for use in connection with the brooder a hover employing an open topped frame and a covering material therefor flexed and dropped toward the floor of the brooder to afford covering facilities for the chicks, thus dispensing with the use of hanging strips.

It further consists in furnishing a hover with side extensions adjustably mounted on the body of the hover, said extensions being adjustable to a lower horizontal plane or to rest upon the floor to form a wall to limit the extent of the brooder.

It further consists in providing the side walls of the brooder with removable cleats the employment whereof varies the height of the said walls.

One embodiment of the present invention is disclosed in the structure illustrated in the accompanying drawings, in which like characters of reference denote corresponding parts in all the views, and in which—

Figure 1 is a perspective view of a brooder and hover constructed and arranged in accordance with the present invention, the side of the brooder being partially cut away to show the end of the hover; Fig. 2 is a longitudinal vertical section of a brooder and hover, showing the latter in its full extended position; Fig. 3 is a cross section taken on the line 3—3 in Fig. 2. Fig. 4 is a cross section showing a fragment of the brooder and hover lifted above the normal height; Fig. 5 is a vertical section showing one side of the hover dropped to limit the free space of the brooder.

The brooder proper comprises the sides 8, 8 and is open both top and bottom. The front wall is provided with a door 9 which is hinged at 10 to be extended in the manner shown in Fig. 1 during the early life of the chicks. The door 9 is provided with a series of ventilating openings 11. The openings 11 are called into service when the hover with which the brooder is provided is disposed in the manner shown in Fig. 2 of the drawings. Secured to the longitudinal sides by means of the hinges 12 are the strips 13 which, when raised as seen in Fig. 3 of the drawings, lift the hover to a height greater than when the same rests upon the upper edge of the sides 8.

The hover employed in the present invention consists of a blanket or loosely mounted cloth 14. The cloth 14 is loosely secured to the lower edge of the sides 15 and of the strips 16. In mounting the cloth 14 the same is permitted to freely bag or sag from the frame to rest above and upon the backs of the chicks when used as a hover or for warming purposes. It will be noted that this cloth is employed in lieu of the usual strips of flannel or other fabric which is suspended from a frame pendant into the path or space occupied by the chicks. The sides 15 are connected crosswise by the braces 17 and 18, and are reinforced at the ends by the battens 19. The strips 16 are connected at the upper edge by the strips 20 which are provided with eyelets 21 which are normally engaged by the hooks 22 to suspend the strips 16 and the cloth 14 supported thereby in the position shown in Fig. 1 of the drawings.

The hover is loosely mounted within the sides 8, 8 of the brooder, resting upon the cleats 23. The cleats 23 normally rest upon the upper edge of the sides 8. In the position where the hover is thus supported the space below the hover is sufficient for a small chick to stand without crowding, but to receive the warming contact of the cloth 14.

In building the hover frame care is exercised to produce the inclined sections 24, to which the cloth 14 shapes itself when the strips 16 are raised. The chicks are thus introduced below the yielding upper wall of the cloth when they undertake to crowd under the inclined space thus provided. The extensions having the strips 16 when released from engagement with the hooks 22 are normally reclined, as shown in Fig. 2, on the supporting cleats 25 with which the front and rear of the brooder is provided. When disposed in this manner it will be seen that the space covered by the brooder below the cloth 14 is completely covered and forms an added protection and warmth for the chicks. As shown in Fig. 5, one of the side extensions of the hover may be depressed to the floor of the brooder, thus limiting the free space thereof. In this position, without raising the depressed extension or side of the hover, the opposite side may be lifted so as to afford cooling ventilation for the hover and brooder.

In employing this invention the hover may be moved manually to dispose the same over the chicks, avoiding in this manner the fright and disturbance occasioned by having to capture or compel the chicks to seek shelter under the brooder. In manipulating a brooder in this manner the care necessary to the preservation of young chicks is facilitated, it being deemed wise to alternately, and for short intervals, protect the chicks by warming them under the hover and then allowing them to cool in the open air. This can readily be accomplished by employing this invention, the hover being removed readily from one end of the brooder to the other, the operator employing for this purpose the braces 17. Also, provision is made for inuring the chicks gradually to the use of the cool brooder.

The cloth 14 under usual conditions as provided by me is a light blanket. It will be understood, however, that this may be augmented by the addition of other cloths, or by the disposition above the cloth 14 of light heat retaining material, such as hair or straw. Also, it will be understood that if heating becomes necessary due to the severity of the climate, some means of introducing the heat above the hover may be provided, the open top of the brooder affording facilities for each and all of these employments.

Having thus described my invention, what I claim as new and desire to secure by Letters Patent is:—

1. In a brooder, a hover having a supporting frame; side extensions of said frame hingedly connected therewith; said extensions being adapted for disposition to rest on the floor of the brooder to limit the free space thereof; and a cloth loosely suspended from said frame and said extension to sag toward the floor of the brooder.

2. In a brooder, a hover having a supporting frame; side extensions of said frame hingedly connected therewith; a cloth loosely suspended from said frame and said extensions to sag toward the floor of the brooder; and means for holding the extensions in vertical arrangement.

3. In a brooder, a hover having a supporting frame; side extensions of said frame hingedly connected therewith; a cloth loosely suspended from said frame and said extensions to sag toward the floor of the brooder; and means for holding the extensions in vertical arrangement to form an open top box-like receptacle.

In testimony whereof I have signed my name to this specification in the presence of two subscribing witnesses.

GEORGE HOWARD LEE.

Witnesses:
L. P. KNEELAND,
B. T. HEYT.